US011860585B2

(12) United States Patent
Crowley et al.

(10) Patent No.: US 11,860,585 B2
(45) Date of Patent: Jan. 2, 2024

(54) WEARABLE ELECTRONIC DEVICE WITH A COMPRESSIBLE AIR-PERMEABLE SEAL

(71) Applicant: Apple Inc., Cupertino, CA (US)

(72) Inventors: Patrick J. Crowley, Cupertino, CA (US); Eric T. Chiang, Lexington, MA (US); Ross L Jackson, Cupertino, CA (US)

(73) Assignee: Apple Inc., Cupertino, CA (US)

(*) Notice: Subject to any disclaimer, the term of this patent is extended or adjusted under 35 U.S.C. 154(b) by 840 days.

(21) Appl. No.: 16/904,294

(22) Filed: Jun. 17, 2020

(65) Prior Publication Data

US 2021/0397140 A1 Dec. 23, 2021

(51) Int. Cl.

| | |
|---|---|
| ***G04G 17/08*** | (2006.01) |
| ***G04G 21/08*** | (2010.01) |
| ***G04B 39/02*** | (2006.01) |
| ***G04B 37/08*** | (2006.01) |

(52) U.S. Cl.

CPC ............. *G04G 17/08* (2013.01); *G04B 39/02* (2013.01); *G04G 21/08* (2013.01); *G04B 37/08* (2013.01)

(58) Field of Classification Search

CPC ........ G04G 17/08; G04G 21/08; G04B 39/02; G04B 37/08

See application file for complete search history.

(56) References Cited

U.S. PATENT DOCUMENTS

| | | | |
|---|---|---|---|
| 3,950,627 | A | 4/1976 | Murata et al. |
| 5,041,330 | A | 8/1991 | Heerton et al. |
| 5,179,505 | A | 1/1993 | Matsuo |
| 5,258,592 | A | 11/1993 | Nishikawa et al. |
| 5,373,487 | A | 12/1994 | Crawford et al. |

(Continued)

FOREIGN PATENT DOCUMENTS

| | | |
|---|---|---|
| CN | 102565149 | 7/2012 |
| CN | 202713849 | 1/2013 |

(Continued)

OTHER PUBLICATIONS

U.S. Appl. No. 16/890,694, filed Jun. 2, 2020, Liang et al.

(Continued)

*Primary Examiner* — Edwin A. Leon
*Assistant Examiner* — Kevin Andrew Johnston
(74) *Attorney, Agent, or Firm* — Brownstein Hyatt Farber Schreck, LLP

(57) ABSTRACT

Embodiments are directed to a smartwatch including a housing that at least partially defines an internal volume, and a touch-sensitive display positioned at least partially within the internal volume. A front cover can be positioned over the touch-sensitive display and can define a front exterior surface. A seal can be positioned between the housing and the front cover and configured to transition between an uncompressed state and a compressed state in response to an increase from a first external pressure on the front cover to a second external pressure. In the uncompressed state, the seal has a first density and is air-permeable allowing an internal pressure of the internal volume to equalize with external air at the first pressure. In the compressed state, the seal has a second density, greater than the first density, and is configured to inhibit ingress of water at the second pressure.

20 Claims, 13 Drawing Sheets

(56) References Cited

U.S. PATENT DOCUMENTS

| | | | |
|---|---|---|---|
| 5,889,737 | A | 3/1999 | Alameh et al. |
| 6,166,662 | A | 12/2000 | Chuang |
| 6,219,304 | B1 | 4/2001 | Mignot et al. |
| 6,292,358 | B1 | 9/2001 | Lee et al. |
| 6,389,143 | B1 | 5/2002 | Leedom et al. |
| 6,501,036 | B2 | 12/2002 | Rochon et al. |
| 6,754,137 | B1 | 6/2004 | Bourquin et al. |
| 6,855,173 | B2 | 2/2005 | Ehrnsperger et al. |
| 6,963,039 | B1 | 11/2005 | Weng et al. |
| 7,075,781 | B2 | 7/2006 | Peng |
| 7,087,850 | B1 | 8/2006 | Murzanski |
| 7,230,196 | B2 | 6/2007 | Toyama |
| 7,269,100 | B2 | 9/2007 | Gilomen |
| 7,355,137 | B2 | 4/2008 | Kawasaki et al. |
| 7,361,859 | B2 | 4/2008 | Yoshioka et al. |
| 7,365,281 | B2 | 4/2008 | Yamaguchi et al. |
| 7,580,533 | B2 | 8/2009 | Schwartz |
| 7,748,272 | B2 | 7/2010 | Kranz et al. |
| 7,764,936 | B2 | 7/2010 | Nakasano et al. |
| 7,850,378 | B1 | 12/2010 | Ligtenberg et al. |
| 7,865,210 | B2 | 1/2011 | Wang et al. |
| 7,958,784 | B2 | 6/2011 | Chouraku et al. |
| 8,050,716 | B2 | 11/2011 | Shin et al. |
| 8,055,003 | B2 | 11/2011 | Mittleman et al. |
| 8,059,490 | B2 | 11/2011 | Rapps et al. |
| 8,092,691 | B2 | 1/2012 | Youngs et al. |
| D653,640 | S | 2/2012 | Kwon et al. |
| 8,178,808 | B2 | 5/2012 | Strittmatter et al. |
| 8,231,795 | B2 | 7/2012 | Martin et al. |
| 8,263,886 | B2 | 9/2012 | Lin et al. |
| 8,299,601 | B2 | 10/2012 | Oka et al. |
| 8,367,928 | B2 | 2/2013 | Hsu et al. |
| 8,371,866 | B1 | 2/2013 | Su et al. |
| 8,381,575 | B2 | 2/2013 | Seo |
| 8,416,542 | B2 | 4/2013 | Nakamura |
| 8,446,713 | B2 | 5/2013 | Lai |
| 8,462,514 | B2 | 6/2013 | Myers et al. |
| 8,470,252 | B2 | 6/2013 | Odueyungbo |
| 8,500,348 | B2 | 8/2013 | Dumont et al. |
| 8,482,305 | B2 | 9/2013 | Johnson |
| 8,526,175 | B2 | 9/2013 | Yukawa et al. |
| 8,562,095 | B2 | 10/2013 | Alleyne et al. |
| 8,591,240 | B2 | 11/2013 | Jenks |
| 8,614,897 | B2 | 12/2013 | Tang |
| 8,624,144 | B2 | 1/2014 | Chiang |
| 8,644,011 | B2 | 2/2014 | Parkinson |
| 8,683,861 | B2 | 4/2014 | Humbert et al. |
| 8,767,381 | B2 | 7/2014 | Shukla et al. |
| 8,770,996 | B2 | 7/2014 | Hsu |
| 8,800,764 | B2 | 8/2014 | Wu |
| 8,804,993 | B2 | 8/2014 | Shukla et al. |
| 8,826,558 | B2 | 9/2014 | Priebe et al. |
| 8,844,158 | B2 | 9/2014 | Dehn |
| 8,942,401 | B2 | 1/2015 | Murayama |
| 8,960,818 | B2 | 2/2015 | Myers et al. |
| 8,994,827 | B2 | 3/2015 | Mistry et al. |
| 9,013,888 | B2 | 4/2015 | Trzaskos et al. |
| 9,072,991 | B2 | 7/2015 | Winters et al. |
| 9,080,961 | B2 | 7/2015 | Adachi |
| 9,084,053 | B2 | 7/2015 | Parkins |
| 9,084,357 | B2 | 7/2015 | Shedletsky et al. |
| 9,099,264 | B2 | 8/2015 | Shedletsky et al. |
| 9,105,420 | B2 | 8/2015 | Shah et al. |
| 9,129,757 | B2 | 9/2015 | Kanbayashi et al. |
| 9,161,434 | B2 | 10/2015 | Merz et al. |
| 9,164,539 | B2 | 10/2015 | Wu |
| 9,171,535 | B2 | 10/2015 | Abe et al. |
| 9,226,076 | B2 | 12/2015 | Lippert et al. |
| 9,240,292 | B1 | 1/2016 | Lapetina |
| 9,253,297 | B2 | 2/2016 | Abe et al. |
| 9,274,506 | B2 | 3/2016 | Lu et al. |
| 9,335,355 | B2 | 5/2016 | Menzel et al. |
| 9,363,587 | B2 | 6/2016 | Weiss et al. |
| 9,363,589 | B2 | 6/2016 | Lippert et al. |
| 9,367,104 | B2 | 6/2016 | Liu |
| 9,387,647 | B2 | 7/2016 | Wei et al. |
| 9,408,009 | B1 | 8/2016 | Witte et al. |
| 9,444,506 | B2 | 9/2016 | Lai et al. |
| 9,445,633 | B2 | 9/2016 | Tulloch et al. |
| 9,529,391 | B2 | 12/2016 | Ely |
| 9,573,165 | B2 | 2/2017 | Weber et al. |
| 9,575,392 | B2 | 2/2017 | Hooton |
| 9,625,944 | B2 | 4/2017 | Weber |
| 9,627,797 | B2 | 4/2017 | Song et al. |
| 9,648,744 | B2 | 5/2017 | Wittenberg et al. |
| D790,517 | S | 6/2017 | Akana et al. |
| 9,780,554 | B2 | 10/2017 | Kardassakis et al. |
| 9,811,121 | B2 | 11/2017 | Cardinali et al. |
| 9,832,567 | B2 | 11/2017 | Zhang et al. |
| 9,880,523 | B2 | 1/2018 | Suwald |
| 9,939,783 | B2 | 4/2018 | Hilario et al. |
| 9,980,026 | B2 | 5/2018 | Zadesky et al. |
| 10,021,800 | B1 | 7/2018 | Zhang et al. |
| 10,078,350 | B2 | 9/2018 | Ely |
| 10,149,396 | B2 | 12/2018 | Lor et al. |
| 10,165,694 | B1 | 12/2018 | Werner et al. |
| 10,184,586 | B2 | 1/2019 | de Jong et al. |
| 10,245,767 | B2 | 4/2019 | Li et al. |
| 10,275,143 | B2 | 4/2019 | Nagaraju et al. |
| 10,285,645 | B2 | 5/2019 | Bushnell et al. |
| 10,466,047 | B2 | 11/2019 | Ehman et al. |
| 10,496,209 | B2 | 12/2019 | Vummidi Murali et al. |
| 10,599,101 | B2 | 3/2020 | Rothkopf |
| 10,606,374 | B2 | 3/2020 | Park et al. |
| 10,837,772 | B2 | 11/2020 | MacNeil et al. |
| 11,334,032 | B2 | 5/2022 | Liang et al. |
| 2006/0210062 | A1 | 9/2006 | DeMichele et al. |
| 2007/0003081 | A1 | 1/2007 | Ram et al. |
| 2008/0302641 | A1 | 12/2008 | Su |
| 2009/0002941 | A1 | 1/2009 | Mongia et al. |
| 2009/0281251 | A1 | 11/2009 | Bae et al. |
| 2010/0232861 | A1 | 9/2010 | Shibata et al. |
| 2011/0103621 | A1 | 5/2011 | Lutz |
| 2012/0067711 | A1 | 3/2012 | Yang |
| 2013/0037396 | A1 | 2/2013 | Yu |
| 2013/0043115 | A1 | 2/2013 | Yang et al. |
| 2013/0146491 | A1 | 6/2013 | Ghali et al. |
| 2013/0170685 | A1 | 7/2013 | Oh et al. |
| 2013/0242481 | A1 | 9/2013 | Kim et al. |
| 2017/0146142 | A1 * | 5/2017 | Germiquet .......... H01M 50/317 |
| 2017/0322658 | A1 * | 11/2017 | Lee ....................... G06F 1/1626 |
| 2018/0052428 | A1 * | 2/2018 | Abramov ................ G06F 1/163 |
| 2018/0068808 | A1 | 3/2018 | Wang et al. |
| 2019/0082547 | A1 * | 3/2019 | Werner ................ H05K 5/0213 |
| 2021/0088981 | A1 | 3/2021 | Liang et al. |

FOREIGN PATENT DOCUMENTS

| | | | | | |
|---|---|---|---|---|---|
| CN | 103974604 | | | 8/2014 | |
| CN | 203811997 | | | 9/2014 | |
| CN | 104080305 | | | 10/2014 | |
| CN | 104517772 | | | 4/2015 | |
| CN | 105049966 | | | 11/2015 | |
| CN | 204906680 | | | 12/2015 | |
| CN | 105323674 | | | 2/2016 | |
| CN | 205121173 | | | 3/2016 | |
| CN | 205121173 | U | * | 3/2016 | |
| CN | 105594225 | | | 5/2016 | |
| CN | 2016133514 | | | 4/2017 | |
| CN | 206323698 | | | 7/2017 | |
| CN | 107148810 | | | 9/2017 | |
| CN | 206819065 | | | 12/2017 | |
| CN | 108139855 | A | * | 6/2018 | ............. A61B 5/681 |
| CN | 108958006 | | | 12/2018 | |
| CN | 109203623 | | | 1/2019 | |
| EP | 0799747 | | | 10/1997 | |
| EP | 0899634 | | | 7/2003 | |
| EP | 2326106 | | | 5/2011 | |
| EP | 2640042 | | | 9/2013 | |
| JP | S5620399 | | | 2/1981 | |
| JP | 200353872 | | | 2/2003 | |
| JP | 200483811 | | | 3/2004 | |
| JP | 2004235724 | | | 8/2004 | |
| JP | 2004244607 | | | 9/2004 | |

(56) References Cited

FOREIGN PATENT DOCUMENTS

| | | | | | |
|---|---|---|---|---|---|
| JP | 2011187298 | | | 9/2011 | |
| JP | 2012253426 | | | 12/2012 | |
| JP | 2014013735 | | | 1/2014 | |
| JP | 2014200024 | | | 10/2014 | |
| JP | 2016022415 | | | 2/2016 | |
| JP | 2016022415 | A | * | 2/2016 | |
| WO | WO 12/117476 | | | 9/2012 | |
| WO | WO 12/117738 | | | 9/2012 | |
| WO | WO-2012117738 | A1 | * | 9/2012 | ........... G06F 1/1626 |
| WO | WO 15/167848 | | | 11/2015 | |
| WO | WO 2018/146027 | | | 8/2018 | |

OTHER PUBLICATIONS

Author Unknown, "What to Do when Gadgets Get Wet," http://gadgetshow.channel15.com/gadget-show/blog/what-to-do-when-gadgets-get-wet, 2 pages, Aug. 23, 2010.

* cited by examiner

WEARABLE ELECTRONIC DEVICE WITH A COMPRESSIBLE AIR-PERMEABLE SEAL

FIELD

The described embodiments relate generally to a portable or wearable electronic device having a sealed interior cavity and, more particularly, to portable or wearable electronic devices having a compressible vented seal.

BACKGROUND

Wearable communication devices such as smartwatches are typically worn by a user throughout the day and may include various sensors that measure environmental conditions. However, because these devices are worn by a user, they can be subjected to a variety of operating conditions that can affect the operability and reliability of the various sensors. For example, during typical use, a wearable communication device may be submerged in water. It may be desirable to protect internal components of wearable communication devices from potentially harmful environmental factors. The following disclosure is directed to a vented seal that allows for barometric pressure equalization while also preventing the ingress of water or other liquids.

SUMMARY

Embodiments described herein are directed to a smartwatch that includes a housing defining an internal volume, a touch-sensitive display positioned at least partially within the internal volume, and a front cover positioned over the touch-sensitive display, where the front cover defines a front exterior surface of the smartwatch. The smartwatch can also include a seal positioned between the housing and the front cover, where the seal is configured to transition between an uncompressed state and a compressed state in response to an increase from a first external pressure on the front cover to a second external pressure on the front cover. In the uncompressed state, the seal can be air-permeable when exposed to the first external pressure, and in the compressed state, the seal can be configured to inhibit water ingress when exposed to the second external pressure.

In some examples, in the uncompressed state, the seal includes one or more passages that allow air to move between the internal volume and an external environment, and in the compressed state, the one or more passages are at least partially collapsed. The seal can include a porous material that is configured to inhibit water ingress when exposed to the first external pressure. In some embodiments, the seal includes a first adhesive layer that couples the porous material to the front cover, and a second adhesive layer that couples the porous material to the housing. In the uncompressed state, the seal can have a first density, and in the compressed state, the seal has a second density greater than the first density. In the compressed state, the seal can be air-impermeable.

In some cases, the housing defines an upper opening and a ledge that extends around the upper opening, the seal is positioned along the ledge, and the front cover extends at least partially into the upper opening of the housing. The smartwatch can include a force sensor that is configured to detect a force applied to the front cover, and the seal can be positioned along a surface of the force sensor. In some cases, the seal includes a polytetrafluoroethylene material.

Embodiments described herein are also directed to an electronic watch that includes a housing that defines an internal chamber of the electronic watch, a cover coupled to the housing and defining a front surface of the electronic watch, and a processing unit positioned within the internal chamber. The electronic watch can also include a compressible seal positioned between the housing and the cover, where the compressible seal is configured to increase in density as a pressure on the front surface of the cover increases. When subjected to an ambient air environment, the compressible seal can be configured to resist an ingress of water at a first water pressure and allow an ingress of air at a pressure of the ambient air environment, and when subjected to a submerged water environment, the compressible seal can be configured to resist an ingress of water at a second water pressure greater than the first water pressure.

The compressible seal can include a first adhesive layer coupled to the housing, a second adhesive layer coupled to the cover, and a porous layer positioned between the first adhesive layer and the second adhesive layer. The porous layer can be configured to compress in response to the pressure on the front surface of the cover increasing. In some cases, the cover includes a set of side surfaces, and the compressible seal is coupled to a back surface of the cover and is positioned adjacent to the set of side surfaces. The housing can define an opening, and the cover can be positioned at least partially within the opening. The electronic watch can define a gap between the cover and the housing, and the gap can provide a path between the ambient air environment and the compressible seal. In some cases, the compressible seal couples the cover to the housing. In some embodiments, the electronic watch also includes a pressure transducer positioned within the internal chamber, and a compression layer positioned between the cover and the housing. The compression layer can be adjacent to the compressible seal and configured to allow the cover to translate in response to changes in the pressure on the cover. The pressure transducer can be configured to detect an internal pressure change caused by the translation of the cover.

Embodiments are also directed to an electronic device that includes a housing, a cover coupled to the housing to define an internal volume, the cover defining a surface of the electronic device, and a seal extending along a perimeter of the cover and coupling the cover to the housing. In response to a first external pressure, the seal can be configured to exhibit a first level of air-permeability, and in response to a second external pressure, greater than the first external pressure, the seal can be configured to exhibit a second level of air-permeability.

In some cases, in response to the first external pressure, the seal is configured to have a first resistance to water entering the housing, and in response to the second external pressure, the seal is configured to have a second resistance to water entering the housing. The second resistance can be greater than the first resistance. In response to the second external pressure, the seal is configured to compress. The electronic device can include a compression limiter that is less compressible than the seal. The compression limiter can include a ledge defined by the housing.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
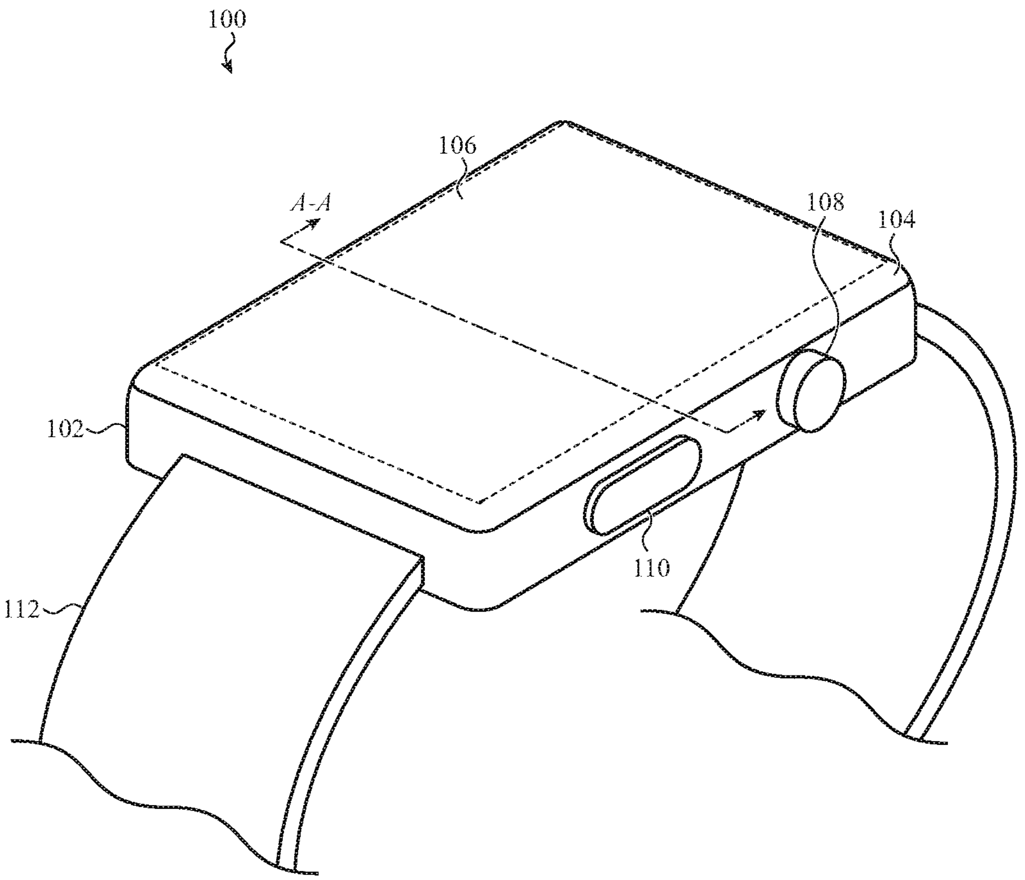
FIG. 1A illustrates a first view of an example electronic device incorporating an air-permeable seal.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Embodiments disclosed herein are directed to an electronic device, such as a portable and/or wearable electronic device that may use an air-permeable seal for equalizing air pressure within the electronic device with the air pressure of the external environment. The air-permeable seal may be implemented on a smartwatch or smartphone and be positioned between a cover and a housing of the electronic device to allow pressure equalization between an internal chamber of the electronic device and the external environment. Unlike some traditional pressure equalization vents which can rupture, tear, and/or leak as pressure on the seal increases, or become clogged over time, the air-permeable seal system described herein may improve the robustness and reliability of electronic devices by compressing, and thereby sealing off, an internal cavity of the electronic device as the external pressure on the device increases. Compression of the air-permeable seal can increase a resistance of the seal to water ingress, which may allow a device incorporating these seals to be taken to greater underwater depths.

In some embodiments, an electronic device may include an internal pressure-sensing device that is positioned within an internal chamber of the electronic device and measures environmental and/or internal pressures of the electronic device. Output from the pressure-sensing device may be used to determine the device's elevation, velocity, direction of motion, orientation, water depth, and so on. For example, a pressure-sensing device may make barometric pressure measurements to determine an elevation of the device or a change in elevation of the device. The accuracy of pressure measurements from the internal pressure-sensing device may rely on the rate of pressure equalization between the internal cavity and the external environment. Accordingly, if pressure equalization is slow, pressure measurements made by the internal pressure-sensing device may lag behind the actual external pressure.

Embodiments described herein are generally directed to electronic devices incorporating a seal that is permeable to air, and resists/inhibits the ingress of water (which may be referred to as an "air-permeable seal") that is positioned between a cover glass and a housing of the electronic device. Such a seal system may be incorporated into electronic devices such as smartwatches, mobile phones, tablet computing devices, laptop computing devices, personal digital assistants, digital media players, wearable devices, and the like to provide an air-permeable seal that allows pressure equalization between an internal chamber of the device and the external environment. When the pressure of the environment around the electronic device increases, the pressure on the cover glass can increase and compresses the seal to restrict air flow into and out of the device. As the external pressure continues to increase, the air-permeable seal may continue to compress, which may further restrict air flow through the seal and/or increase the water resistance of the seal. When the seal is fully compressed, the seal may become impermeable to air as well as resist water penetration at greater pressures (depths) thereby isolating/sealing the internal chamber of the electronic device from the external environment.

As described herein, the air-permeable seal may be positioned between two or more outer housing members. For example, the air-permeable seal can be positioned between a cover glass and a housing of an electronic device. The air-permeable seal can extend around a perimeter of the cover glass such that the exposed surface area of the air-permeable seal is maximized to increase the air flow between the internal chamber and the external environment. In some embodiments, the air-permeable seal can couple the cover glass to the housing. Accordingly, the pressure that is applied to the front cover glass may be transferred to the air-permeable seal and compress the air-permeable seal, which can restrict air flow through the seal and/or increase a water resistance of the seal. As the pressure on the cover glass is decreased, the air-permeable seal may expand and the air flow through the seal may increase, thereby allowing pressure to equalize more quickly between an internal chamber of the device and the external environment.

As described herein, the air-permeable seal may include multiple layers and/or multiple different materials. For example, the air-permeable seal can include a first air-permeable material forming a first layer of the air-permeable seal, where the first material is air-permeable and repels water. The first material may be coupled with the housing via a second layer of adhesive material and may also be coupled to the cover glass via a third layer of adhesive material. The second and third layers of adhesive materials can be stiffer than the first air-permeable material such that, as the cover glass is moved toward the housing, the first air-permeable material compresses. In some cases, the first and second layers of the adhesive materials may be substantially impermeable to both water and air. Accordingly, pressure equalization between the internal cavity of the device and the external environment may occur via air flow through the first air-permeable material. In some embodiments, the seal can include multiple layers of air-permeable material, which may be used to increase the air flow between the internal cavity and the external environment, which may reduce lag in pressure measurement from an internal pressure-sensing device.

In some embodiments, as described herein, the air-permeable seal system can be used to estimate an external water pressure. For example, when the electronic device is brought underwater, the increased pressure on a cover glass of the device may compress the air-permeable seal thereby sealing the internal chamber from the external environment. In some cases, the air-permeable seal can include a second compressible layer that is also impermeable to water. As the external pressure increases (e.g., due to increasing depth), the second compressible layer may compress, thereby compressing air sealed within the internal chamber. The internal pressure-sensing device may measure these pressure changes in the internal chamber due to the seal compressing, and use these pressure measurements to estimate an external pressure and/or water depth of the device.

In some embodiments, as described herein, the air-permeable seal system can include a compression limiter. For example, the compression limiter may restrict movement of the cover glass towards the housing thereby restricting the amount of compression experienced by the air-permeable seal. In some cases, the compression limiter may protect the air-permeable seal from damage due to over compression.

As described herein, the air-permeable seal system can also include a backup or secondary seal system. For example, a second seal may be positioned between the cover glass and the housing. In an uncompressed state, the second seal may be offset from either the cover glass or the housing to form an air gap. Accordingly, in the uncompressed state, the air-permeable seal may be the primary mechanism for preventing water from entering the internal chamber while allowing the pressure to equalize with the external environment. In a compressed state, the cover glass may move toward the housing and the secondary seal may become compressed between the cover glass and the housing which may further seal the internal chamber.

These and other embodiments are discussed below with reference to FIGS. 1A-11. However, those skilled in the art will readily appreciate that the detailed description given herein with respect to these Figures is for explanatory purposes only and should not be construed as limiting.

FIG. 1A illustrates a first view of an example electronic device 100 incorporating an air-permeable seal. The electronic device 100 is depicted as an electronic watch (e.g., a smartwatch), though this is one example embodiment of an electronic device and the concepts described herein may apply equally or by analogy to other electronic devices, including mobile phones (e.g., smartphones), tablet computers, notebook computers, head-mounted displays, digital media players (e.g., mp3 players), health-monitoring devices, other portable electronic devices, or the like. The electronic device 100 can incorporate an air-permeable seal as described herein.

The electronic device 100 may be worn by a user and include one or more sensors that determine or estimate a condition of the environment (e.g., barometric pressure, moisture level, temperature, and so on) and/or condition(s) of the user (e.g., heart rate, position, direction of movement, body temperature, and so on), which may be displayed or presented to the user. Different sensors may be positioned at different locations on or within the electronic device 100 depending on operating requirements of a particular sensor, the condition being detected by the sensor, the design of the electronic device 100, and so on. In some cases, it may be desirable to protect electronic and/or other water sensitive components that are located within the electronic device 100 from being exposed to water, or other environmental conditions such as dust, debris, contamination, and so on. Accordingly, the electronic device 100 can be sealed to protect these components.

The electronic device 100 can include an air-permeable seal to allow pressure in the sealed internal chamber of the electronic device to equalize with the external environmental pressure. As used herein, the term air-permeable refers to materials that are permeable to air and/or impermeable or resistant to water ingress. For example, an air-permeable seal can allow air to move through one or more materials in the seal such that pressure differences across the seal can be equalized, and may prevent water from ingress into the seal. In some cases, the air-permeable seal may alleviate the buildup of pressure within the internal chamber of the electronic device 100 which, without the air-permeable seal, would cause other seals or components of the electronic device to fail. Additionally or alternatively, the air-permeable seal can allow a pressure-sensing device located within the internal chamber of the electronic device 100 to be used to determine a barometric pressure of the external environment. For example, the air-permeable seal can allow the pressure in the internal chamber to equalize with the pressure of the ambient environment. Accordingly, barometric pressure measured by the internal pressure-sensing device can correspond to the external barometric pressure.

As used herein, the term air-impermeable refers to materials that do not allow air to move through the material. For example, an air-impermeable material can prevent an air pressure on one side of the seal (e.g., ambient air pressure) from equalizing with a second, different, air pressure on the other side of the seal (e.g., air pressure in an internal chamber).

The electronic device 100 can include a housing 102 and a cover glass 104 (which may be referred to simply as a "cover") coupled to the housing 102. The cover 104 can be transparent and positioned over a display 106. The housing 102, the cover 104 and the air-permeable seal, along with other components, may form a sealed internal chamber or volume of the electronic device 100. The sealed internal chamber can contain a pressure-sensing device along with other electrical components. In some cases, the cover 104 defines a substantial entirety of the front surface of the electronic device 100. The cover 104 can also define an input surface of the electronic device 100. For example, as described herein, the electronic device 100 may include touch and/or force sensors that detect inputs applied to the cover 104. The cover 104 may be formed from or include glass, sapphire, polymer, dielectric, or any other suitable material.

The display 106 can be positioned under the cover 104 and at least partially within the housing 102. The display 106 can define an output region in which graphical outputs are displayed. Graphical outputs may include graphical user interfaces, user interface elements (e.g., buttons, sliders, etc.), text, lists, photographs, animations, videos, or the like. The display 106 can include a liquid-crystal display (LCD), organic light emitting diode display (OLED), or any other suitable components or display technology. In some cases, the display 106 can output a graphical user interface with one or more graphical objects that display information collected from or derived from the pressure-sensing system. For example, the display 106 can output a current barometric pressure associated with the electronic device 100 or estimated altitude of the electronic device 100.

The display 106 may include or be associated with touch sensors and/or force sensors that extend along the output region of the display and which may use any suitable sensing elements and/or sensing techniques. Using touch sensors, the electronic device 100 may detect touch inputs applied to the cover 104, including detecting locations of touch inputs, motions of touch inputs (e.g., the speed, direction, or other parameters of a gesture applied to the cover 104), or the like. Using force sensors, the device 100 may detect amounts or magnitudes of force associated with touch events applied to the cover 104. The touch and/or force sensors may detect various types of user inputs to control or modify the operation of the device, including taps, swipes, multiple finger inputs, single- or multiple-finger touch gestures, presses, and the like. Touch and/or force sensors usable with wearable electronic devices, such as the device 100, are described below.

The electronic device 100 may also include a crown 108 having a cap, protruding portion, or component(s) or feature (s) (collectively referred to herein as a "body") positioned along a side surface of the housing 102. At least a portion of the crown 108 (such as the body) may protrude from, or otherwise be located outside, the housing 102, and may define a generally circular shape or circular exterior surface. The exterior surface of the body of the crown 108 may be textured, knurled, grooved, or otherwise have features that may improve the tactile feel of the crown 118 and/or facilitate rotation sensing.

The crown 108 may facilitate a variety of potential interactions. For example, the crown 108 may be rotated by a user (e.g., the crown may receive rotational inputs). Rotational inputs of the crown 108 may zoom, scroll, rotate, or otherwise manipulate a user interface or other object displayed on the display 106 (among other possible functions). The crown 108 may also be translated or pressed (e.g., axially) by the user. Translational or axial inputs may select highlighted objects or icons, cause a user interface to return to a previous menu or display, or activate or deactivate functions (among other possible functions). In some cases, the device 100 may sense touch inputs or gestures applied to the crown 108, such as a finger sliding along the body of the crown 108 (which may occur when the crown 108 is configured to not rotate) or a finger touching the body of the crown 108. In such cases, sliding gestures may cause operations similar to the rotational inputs, and touches on an end face may cause operations similar to the translational inputs. As used herein, rotational inputs include both rotational movements of the crown (e.g., where the crown is free to rotate), as well as sliding inputs that are produced when a user slides a finger or object along the surface of a crown in a manner that resembles a rotation (e.g., where the crown is fixed and/or does not freely rotate). In some embodiments, rotating, translating, or otherwise moving the crown 108 initiates a pressure measurement by a pressure-sensing system (such as an external and/or internal pressure-sensing device) located on or within the electronic device 100. In some cases, selecting an activity, requesting a location, specific movements of the user, and so on may also initiate pressure measurements by the pressure-sensing system.

The electronic device 100 may also include other inputs, switches, buttons, or the like. For example, the electronic device 100 includes a button 110. The button 110 may be a movable button (as depicted) or a touch-sensitive region of the housing 102. The button 110 may control various aspects of the electronic device 100. For example, the button 110 may be used to select icons, items, or other objects displayed on the display 106, to activate or deactivate functions (e.g., to silence an alarm or alert), or the like.

The electronic device 100 may include a band 112 coupled to the housing 102. The band may be configured to couple the electronic device 100 to a user, such as to the user's arm or wrist. A portion of the band 112 may be received in a channel that extends along an internal side of the housing 102, as described herein. The band 112 may be secure to the housing within the channel to maintain the band 112 to the housing 102.

Figure 1B:
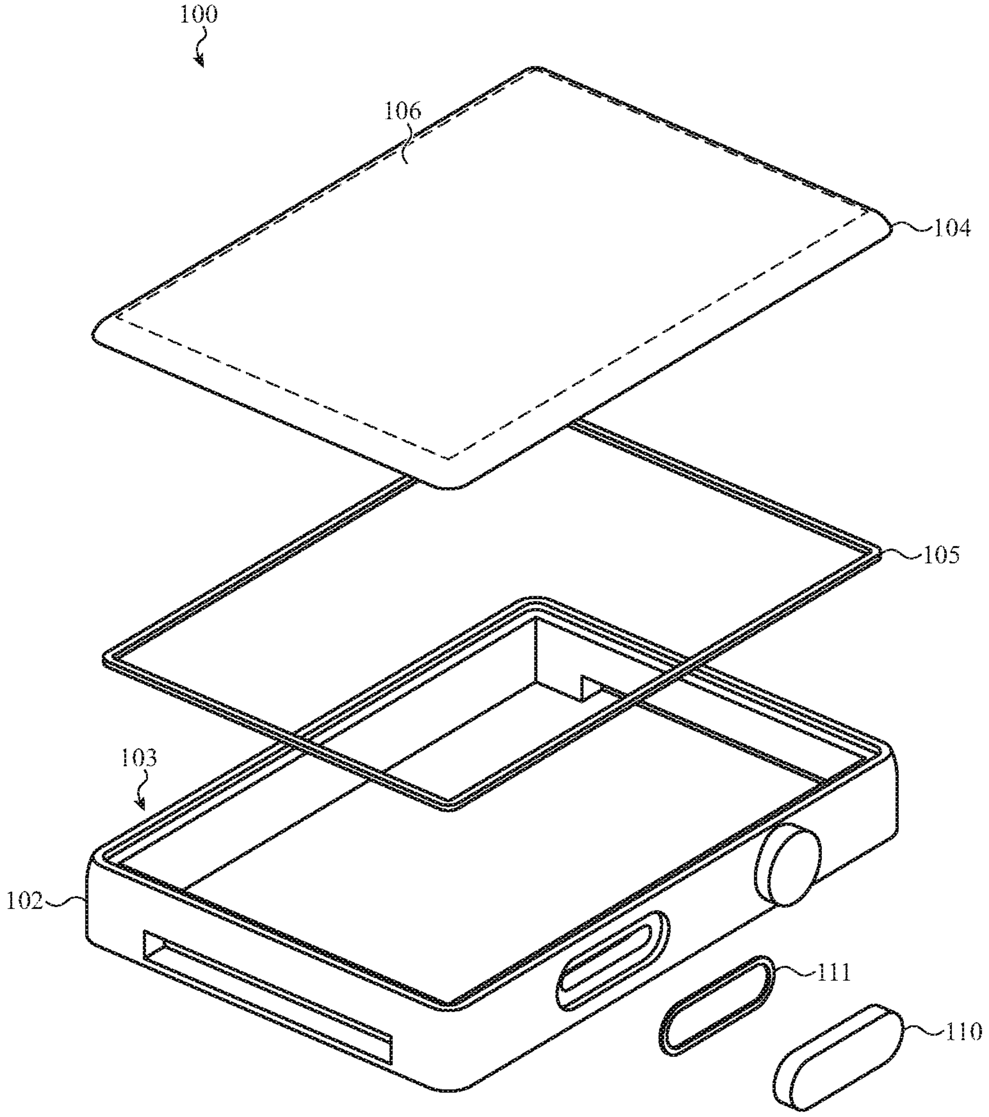
FIG. 1B illustrates an exploded view of an example electronic device incorporating an air-permeable seal.

FIG. 1B illustrates an exploded view of the electronic device 100. The electronic device 100 can include an air-permeable seal 105 (hereinafter referred to as the "seal") positioned between the housing 102 and the cover 104. The seal 105 can extend along and/or around a perimeter of the cover 104 and couple the cover 104 to the housing 102. In some embodiments, the seal 105 can be positioned on an upper surface of the housing 102, and orient the cover 104 at least partially within an upper opening defined by the housing 102.

The seal 105 can include an air-permeable compressible material that inhibits water ingress. For example, the seal 105 can be include a polytetrafluoroethylene (PTFE) material, such as expanded PTFE, or nylon, polyester, acrylic, or any other suitable materials. In some embodiments, the seal 105 can be include foam or expanded materials that are permeable to air but resist the movement of water through the material. When a force is applied to the cover 104, this force can be transferred to the seal 105 causing the seal 105 to compress between the housing 102 and the cover 104. This compression can cause the density of the seal 105 to increase, which can increase the water resistance of the seal 105 (ability of the seal to inhibit water ingress) and/or restrict air flow through the seal 105. In some cases, compression of the seal 105 can cause the seal 105 to become impermeable to air. The seal 105 can be configured such that when the pressure/force is removed from the cover 104, the seal 105 can expand, which allows air to move through the seal 105 and equalize the pressure inside the housing with an external pressure.

In some embodiments, the housing 102 may be sealed and/or otherwise include one or more watertight and/or airtight seals and the seal 105 may be the primary or only mechanism for equalizing a pressure inside the housing with an external pressure. Accordingly, if the seal 105 is compressed and air flow is restricted through the seal 105, an internal pressure of the housing may not equalize with the external air pressure.

In some embodiments, one or more input devices, such as the other portions of the housings, the crown 108, and/or the button 110, also include an air-permeable seal. For example, as illustrated in FIG. 1B, the button 110 can include an air-permeable button seal 111 that is positioned between the button 110 and the housing 102. The button seal 111 can function as described herein to allow air to move between the external environment and the internal chamber and prevent the ingress of water into the internal chamber. In some cases, the properties of the different seals can be configured based on their location and/or the type of opening being sealed. For example, the button seal 111 could be a softer material that compresses more easily than the cover seal 105, such that the button seal 111 compresses in response to lower forces that may be generated by the smaller surface area of the button 110. In this regard, the electronic device 100 can have multiple different seals that are positioned at different locations on the device and can have different properties that are based on the operating conditions of the structure that is being sealed.

The housing 102 can define an upper opening 103 that is formed by one or more sidewalls of the housing and extends around an outer periphery of the housing 102. The cover 104 can be positioned at least partially within the upper opening 103. For example, a first portion of the cover 104 may be located above a top portion of the housing 102, and a second portion of the cover 104, such as a bottom surface, can extend into the housing and contact a portion of the housing such as a ledge. An upper surface of the cover 104 can function as a touch input surface and may be positioned above the housing 102 to allow a user to interact with the display 106. The cover 104 can include one or side surfaces, between the bottom surface and the upper surface, that define a periphery of the cover 104, and the shape of the periphery of the cover 104 can be configured to match the shape of the upper opening 103. In some cases, the seal 105 can extend along the outer periphery defined by the side surfaces of the cover 104. In this regard, the seal 105 may form a closed boundary between the housing 102 and the cover 104, which can include the seal fully encircling the opening without any gaps or breaks that allow for the passage of water or unrestricted air flow.

In some cases, the seal 105 can be configured to transition between a first state (in which the seal is air-impermeable and has a first resistance to water ingress) and a second state (having a second resistance to water ingress that is greater than the first resistance) based on other physical stimuli than pressure. For example, the seal 105 can include a hydrophilic material such as a hydrogel. Upon being exposed to water, the seal 105 could absorb water, which can increase the seal's 105 resistance to further water ingress. In other cases, the seal 105 could be heat and/or electrically activated. For example, at a first temperature, the seal 105 could exhibit characteristics of the first state (air-permeable and have a first resistance to water ingress). When heated or cooled to a second temperate, different from the first, the seal 105 could exhibit characteristics of the second state (increased resistance to water ingress).

Figure 2A:
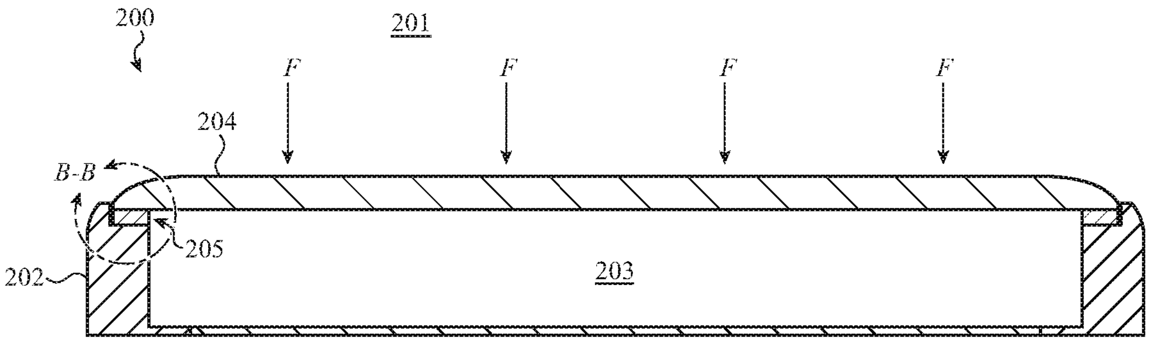
FIG. 2A illustrates a cross-sectional view of an example electronic device taken along line A-A.

FIG. 2A illustrates a cross-sectional view of an electronic device 200 taken along section A-A of FIG. 1A. The electronic device 200 of FIGS. 2A and 2B may correspond to the other electronic devices described herein, including the electronic device 100 of FIGS. 1A and 1B. A redundant description of shared elements and features is omitted for clarity. The electronic device 200 can include a housing 202, which can be an example of the housing described herein (e.g., housing 102); a cover 204, which can be an example of the covers described herein (e.g., cover 104); and a seal 205, which can be an example of the seals described herein (e.g., seal 105). The housing 202, the cover 204 and the seal 205 can form at least part of an internal chamber 203 of the electronic device 200. The internal chamber 203 can define an internal volume of the electronic device 200 and various components such as electrical components of the electronic device 200 can be housed within the internal chamber 203.

As described herein, the cover 204 can be positioned at least partially within an opening defined by the housing. The cover 204 can couple to the housing 202 via the seal 205. For example the seal 205 can be coupled to the housing 202, and the cover 204 can be supported by the seal 205, such that a force/pressure applied to the cover 204 is transferred to the seal 205. In some cases, force (F) applied to the cover 204 may be due to a pressure of the external environment 201. For example, the pressure of the external environment 201 can be a barometric pressure at the location of the electronic device 200. In some cases, the electronic device 200 can be taken underwater, and the pressure of the external environment 201 can be a pressure exerted by the water on the electronic device, which can increase as the electronic device is taken deeper in the water. The internal chamber 203 can also exert a pressure on the cover 204 (and housing 202), which can be based an internal pressure of air located within the internal chamber 203. The difference in pressure between the external environment 201 and the internal chamber 203 can create a force on the cover 204. For example, if the pressure of the external environment 201 is greater than the pressure of the internal chamber 203, then the positive net force may be applied to an outer surface of the cover 204, which can cause the seal 205 to compress moving the cover 204 toward the housing 202. Subsequently, if the pressure of the external environment 201 decreases, the seal 205 may expand and move the cover 204 away from the housing 202.

In some embodiments, the seal 205 can include a porous material, which may allow air to move into and out of the internal chamber 203. Accordingly, if a pressure differential exists between the internal chamber 203 and the external environment 201, then the seal 205 may allow air to move into or out of the internal chamber 203 to equalize a pressure of the internal chamber with a pressure of the external environment 201.

In some embodiments, the seal 205 can be configured to remain substantially uncompressed when the electronic device 200 is located in an ambient air environment at external environmental pressures typically inhabited by a person (e.g., around sea level to around 5,000 or 10,000 feet above sea level, or greater). Accordingly, when located in an ambient air environment, the seal 205 may remain substantially uncompressed and can equalize the pressures of the internal chamber 203 with an ambient air pressure of the ambient air environment. Further, when subjected to the ambient air environment, the seal 205 can exhibit a first resistance to water entering the internal chamber 203.

The seal 205 can also be configured to compress when the electronic device 200 is submerged in water. For example, the weight of the water may apply an external pressure on the front surface of the cover 204 that compresses the seal 205 and increases the density of the seal 205. As the electronic device is taken to deeper depths, the seal 205 may continue to compress until it is substantially fully compressed. When the electronic device 200 is subjected to the submerged water environment, the compressible seal can exhibit a second resistance to water entering the internal chamber 203, which can be greater than the first resistance when the seal 205 is uncompressed. When compressed, the seal 205 may prevent air from moving between the internal chamber 203 and the external environment 201. As the seal 205 is compressed the seal 205 may become more resistant to water passing through the seal 205 material. Accordingly, as the electronic device 200 is taken into the water, the seal 205 can compress, increasing in density, which may increase its resistance to water ingress into the internal chamber 203. As the electronic device is brought to greater depths within the water, the seal 205 may continue to increase its water resistance until it is substantially fully compressed.

In the compressed state, the seal 205 may reduce or prevent the pressure within the internal chamber 203 from equalizing with the pressure of the external environment 201. Accordingly, while the electronic device 200 is submerged in water, a pressure differential can exist between the internal chamber 203 and the external environment 201. For example, if the seal 205 compresses when the internal chamber 203 has a first internal pressure, the internal chamber 203 may remain around this first internal pressure even as the electronic device is take to greater depths resulting in greater external pressures being exerted on the outer surface of the housing 202 and cover 204.

Figure 2B:
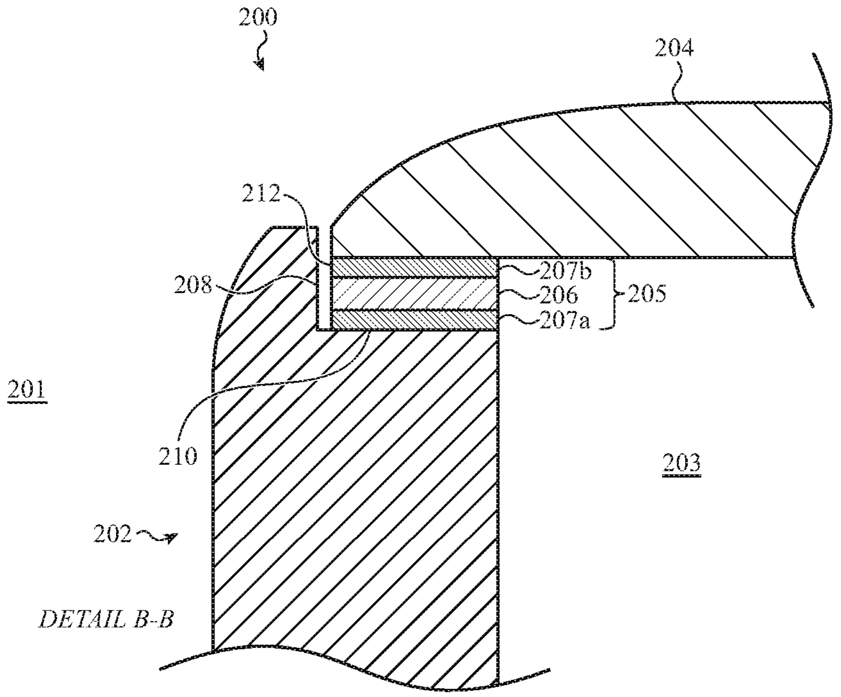
FIG. 2B illustrates a detailed view of the example electronic device shown in FIG. 2A.

FIG. 2B illustrates a detailed view of the electronic device 200 shown by line B-B in FIG. 2A. As illustrated in FIG. 2B, the seal 205 can include multiple layers. A first layer 206 can include an air-permeable material that is permeable to air and resistant to water, as described herein. The first layer 206 can be coupled to the housing 202 and the cover 204 using one or more adhesive materials. For example, a second layer 207*a* can include a first adhesive material that couples the first layer 206 (air-permeable material) to the housing 202. A third layer 207*b* can include a second adhesive material that couples the first layer 206 to the cover 204. Accordingly, the seal 205 can couple the cover 204 to the housing 202 such that the seal 205 can resist compressive, tensile, and shear forces, and the like or combinations thereof.

The cover 204 may define an outer surface that faces the external environment and a lower/inner surface that faces the internal chamber 203. In some cases, the seal can be coupled to the lower surface of the cover 204. In some cases, the cover 204 can define a set of side surfaces 212. The housing 202 can define a first upper surface 208 that forms an internal boundary of the opening. The housing 202 can also define a second upper surface 210 that forms a ledge for supporting the seal 205 and the cover 204. In some embodiments, the seal 205 can couple to the second upper surface 210 and couple to the cover 204, such that the set of side surfaces 212 of the cover 204 is positioned within the opening defined by the first upper surface 208. In some embodiments, the set of side surfaces 212 can be offset from the first upper surface 208 of the housing 202 to form a gap between the housing and the cover 204. This gap may extend between the seal 205 and the housing 202. In this regard, the gap may allow for air and/or water to reach the seal, thereby allowing the seal 205 to equalize the pressure of the internal chamber 203 with the pressure of the external environment. In some cases, having the cover 204 and the seal 205 at least partially surrounded by the housing 202 can help protect these components from damage and/or constrain the movement of these components in relation to the housing 202. For example, such a configuration may allow the cover 204 to move up and down and the seal to compress and expand, but limit side-to-side motion of the cover glass 204, which can reduce sheer on the seal 205.

Figure 3A:
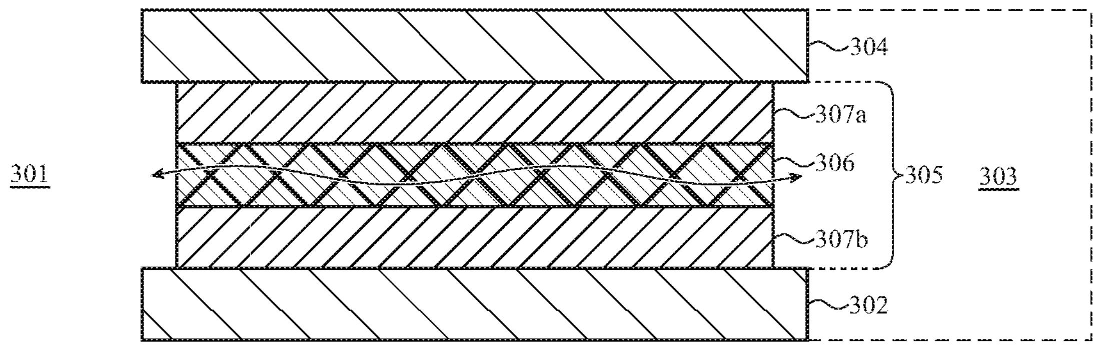
FIG. 3A illustrates an example air-permeable seal in an expanded state.
Figure 3B:
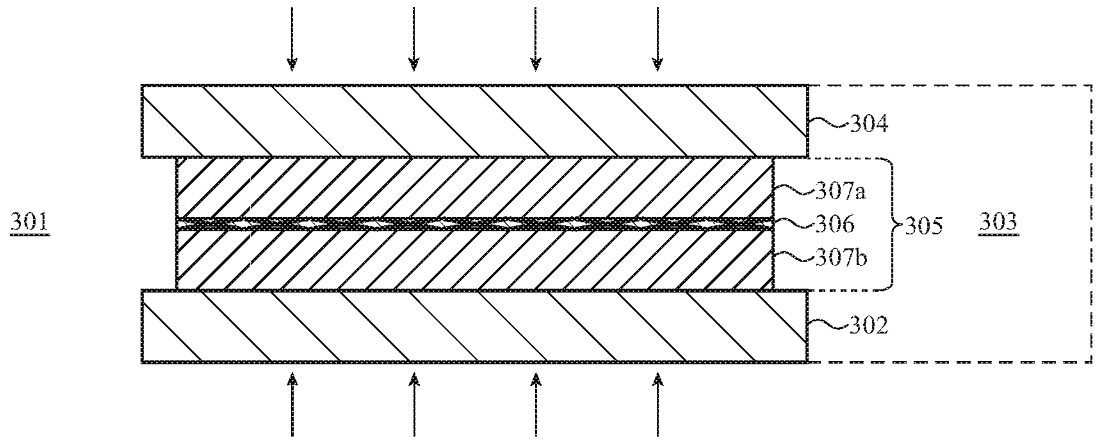
FIG. 3B illustrates an example air-permeable seal in a compressed state.

FIGS. 3A and 3B illustrate examples of a seal 305 in expanded (lower density) and compressed (higher density) states. The seal 305 may be an example of the seals described herein (e.g., seals 105 and 205) and be coupled to a housing 302, which may be an example of the housing described herein (e.g., housings 102 and 202); and a cover 304, which may be an example of the covers described herein (e.g., covers 104 and 204). The seal 305 can include an air-permeable material 306, which may be an example of the air-permeable materials described herein (e.g., air-permeable material 206); and one or more adhesive materials 307, which may be examples of the adhesive materials described herein (e.g., adhesive materials 207). The seal 305 can separate an external environment 301 from an internal chamber 303 that is at least partially defined by the housing 302 and the cover 304.

As illustrated in FIG. 3A, the seal 305 can be in an uncompressed state as described herein. In the uncompressed state, the air-permeable material 306 can have a first density, which may allow air to move between the external environment 301 and the internal chamber 303. Additionally or alternatively, the air-permeable material 306 can have a first resistance to water that prevents water ingress into the internal chamber 303. Accordingly, when the seal 305 is uncompressed, the air-permeable material 306 can allow the pressure of the internal chamber 303 to equalize with the pressure of the external environment 301, while preventing water from entering the internal chamber 303.

In some embodiments, the air-permeable material 306 may be configured to support different flow rates of air between the external environment 301 and the internal chamber 303. The air flow rate can depend on the properties of the air-permeable material 306, the amount of surface area of the air-permeable material 306 between the external environment and the internal chamber 303, as well as other factors. In some cases, positioning the seal 305 between the housing 302 and the cover 304 may increase the surface area of the seal 305 as compared to devices that incorporate air-permeable vents into ports on the housing, such as a speaker port. In some embodiments, the air flow rate of the seal 305 can be configured to be between 5 and 20 standard cubic centimeters per minute (SCCM). In other cases, the air flow rate of the seal 305 may be configured to be above 50, 100 or 150 SCCM. In some embodiments, the air flow rate of the seal may decrease over time. In this regard, the seal 305 can initially be configured with a higher air flow rate to maintain functions of the electronic device (e.g., internal pressure sensing) while accounting for decreases in the air flow rate over the life of the seal 305.

The air-permeable material 306 can include polymer materials such as expanded polymers, foams (open cell and/or closed cell), porous materials, or other materials that are permeable to air, and resistant to water ingress. For example, the air-permeable material can include PTFE materials, such as expanded PTFE (ePTFE), nylon, polyester, acrylic, or other suitable materials. In some cases, the air-permeable material can include composite materials, such as a polymer-metal composite or other suitable combination of materials. In some embodiments, the air-permeable material 306 and/or the adhesive materials 307 can be about 10 microns to about 100 microns thick.

In some embodiments, in the uncompressed state, the air-permeable material 306 can define passages that allow air to move between the internal chamber 303 and the external environment 301. For example, these passages may be property of the air-permeable material 306, and may be homogenously distributed throughout the air-permeable material 306, which may include channels formed from expanded portions of the air-permeable material 306. In other examples, the passages can be one of more defined channels within the air-permeable material 306. For example, the defined channels could be machined, etched, or otherwise formed in the air-permeable material 306 to allow air to move between the internal chamber 303 and the external environment 301. For example, the channels could be formed in a circuitous path, such as a spiral pattern, that allows air to pass, but impedes the ingress of water or other liquid into the internal chamber 303. In some cases, the channels can be formed in one or more of the adhesive layers 307, and can be configured to compress, collapse, become blocked, or otherwise restricted as the seal 305 compresses.

As illustrated in FIG. 3B, the seal 305 can be compressed as described herein. In the compressed state, the air-permeable material 306 can have a greater density, which may prevent/restrict air from moving between the internal chamber 303 and the external environment 301, and increase a water resistance of the seal 305. In the compressed state, the seal 305 can prevent the pressure within the internal chamber from equalizing with the pressure of the external environment. Additionally or alternatively, the air-permeable material 306 may prevent water at greater pressures (depths) from moving through the air-permeable material 306 and into the internal chamber 303. In some cases, compression of the seal 305 may close paths within the air-permeable material 306 that allowed air to move through the air-permeable material 306 in the uncompressed state.

In some embodiments, the adhesive layers 307 can have a greater resistance to compression than the air-permeable material 306. In this regard, the adhesive layers 307 may remain substantially uncompressed when the air-permeable material 306 becomes fully compressed. The adhesive layers 307 can also be impermeable to air and water, thus, any movement of air and/or water into or out of the internal chamber 303 would occur through the air-permeable material 306. In some cases, compression of the air-permeable material 306 can also mechanically reinforce the seal 305. For example, compression of the air-permeable material 306 can result in the shear resistance increasing between the seal 305, the housing 302 and the cover 304. In this regard, the compressed seal 305 may be able to withstand external and/or internal pressures that would cause an uncompressed seal to fail (detach, rip, etc.). In some cases, the air-permeable material 306 can be configured to progressively compress when brought to increasing depths in a submerged water environment. For example, if the electronic device is brought to relatively shallow submersion depths, such as near the water surface, the air-permeable material 306 may be configured to partially compress and have a first resistance to water ingress. As the electronic device is brought to increasing depth, the air-permeable material 306 may compress to a greater density and have a second, increased resistance to water ingress. Accordingly, as the electronic device is brought to deeper depths, the water resistance of the seal 305 may increase.

In some embodiments, the seal 305 can be configured to expand when the pressure/force that cause the seal 305 to compress is removed. In this regard, the seal 305 may cycle between compressed and uncompressed states.

Figure 4:
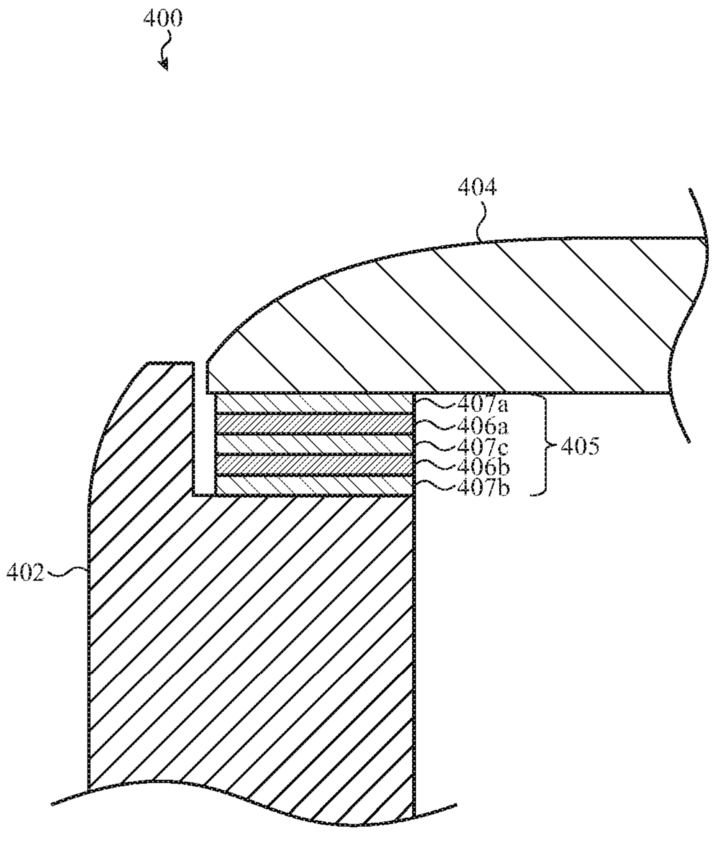
FIG. 4 illustrates an example air-permeable seal for an electronic device.

FIG. 4 illustrates an example of a seal 405 for an electronic device 400. The seal 405 can be an example of the seals described herein (e.g., seals 105, 205, and 305) and can couple a housing 402 to a cover 404, which may be examples of the housings and covers described herein (e.g., housings 102, 202, and 302; and covers 104, 204, and 304). The seal 405 can include multiple layers of an air-permeable material 406 to increase an air flow rate of the seal 405. For example, the seal 405 can include a first layer of air-permeable material 406*a* and a second layer of air-permeable material 406*b* that are stacked on top of each other to increase a surface area of the air-permeable material 406 contained within the seal 405. In other embodiments, additional layers of air-permeable material 406 could be included in the seal to further increase the surface area of the air-permeable material 406, which can be used to increase an air flow rate through the seal 405.

In some cases, one or more air-permeable layers 406 of can be coupled to each other and/or the housing 402 and the cover 404 via one or more adhesive layers 407. Different adhesive layers 407 may be the same adhesive material. In other cases, the different adhesive layers 407 can be different. For example, if the cover 404 is a glass material, a first adhesive layer 407*a* that is configured to bond with the glass material may be used to couple the air-permeable layer 406 to the cover 404. Additionally, if the housing 402 includes a different material from the cover 404 (e.g., metal, ceramic, plastic, or the like) a second adhesive layer 407*b* that is configured to bond with the housing material can be used to couple the housing 402 to the air-permeable layer 406. In other embodiments, the air-permeable layers 406 can be the same or different air-permeable materials, which may have different air flow rates, water resistance, compressibility, and so on.

In some cases, the electronic device 400 can include a force sensor positioned between the housing 402 and the cover 404. For example, the force sensor can include two electrode layers separated by a compressible material, and the amount of force can be estimated by detecting a change in capacitance between the two electrode layers due to compression of the compressible material. The compressible material can be formed from silicone, or other compressible or elastomer materials. In some cases, the force sensor can include a separate set of layers and be stacked with the seal 405 between the housing 402 and the cover 404. In other examples, the force sensor can be integrated with the seal 405. For example, the air-permeable layer 406 could form the compressible layer of the force sensor and two electrodes could be placed on either side of the air-permeable layer 406.

FIGS. 5A-5D illustrate examples of electronic devices 500 with seals 505 that include a compression limiter 506. The electronic device 500 can be an example of the electronic devices described herein such as electronic devices 100, 200, 300 and 400; and the seals 505 can be an example of the seals described herein (e.g., seals 105, 205, 305 and 405). In some embodiments, the seals 505 can be positioned between a housing 502 and a cover 504, which may be examples of the housings and covers as described herein.

The electronic device 500 can include a compression limiter 506, which may be used to limit the amount of compression experienced by the seal 505. In some cases, compressing the seal 505 more than a certain amount may damage the seal 505 and/or result in the seal 505 not fully expanding when a pressure on the cover 504 is reduced. In this regard, the compression limiter 506 can be positioned between the housing 502 and the cover 504. The compression limiter 506 can be formed from a material that is more rigid than the seal 505 and stops movement of the cover 504 toward the housing 502 to stop the seal 505 from compressing past a certain amount.

Figure 5A:
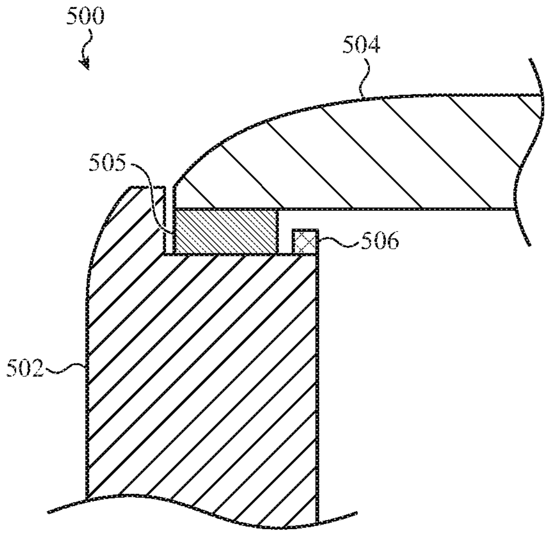
FIGS. 5A-5D illustrate example air-permeable seals for an electronic device.

FIG. 5A illustrates a first example of a compression limiter 506 that is positioned inside of the seal 505 and coupled to the housing 502. In this regard, as the cover 504 moves toward the housing 502, the cover 504 will contact the compression limiter 506 and stop moving toward the housing 502 before the seal 505 is fully compressed. In some cases, the compression limiter 506 may be configured to allow the seal 505 to compress enough to stop air movement through the seal 505 or increase the water resistance of the seal by a defined amount.

Figure 5B:
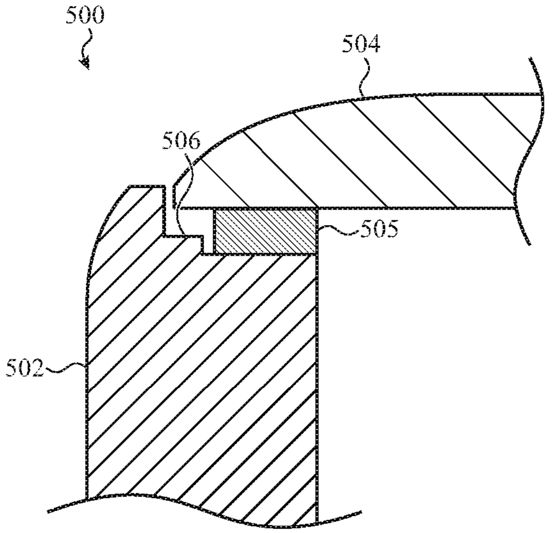
Figure 5C:
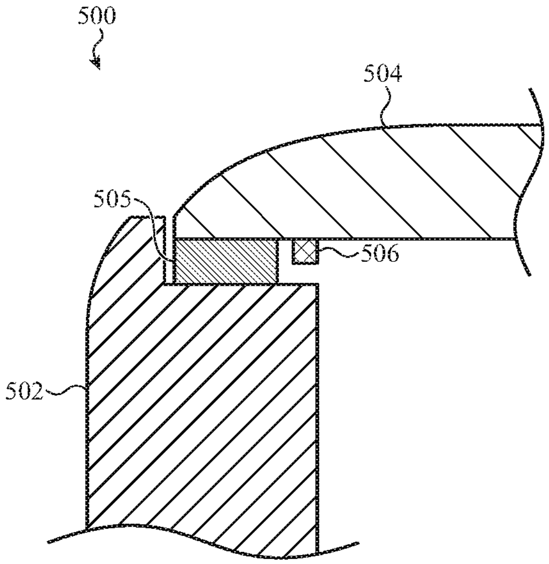
Figure 5D:
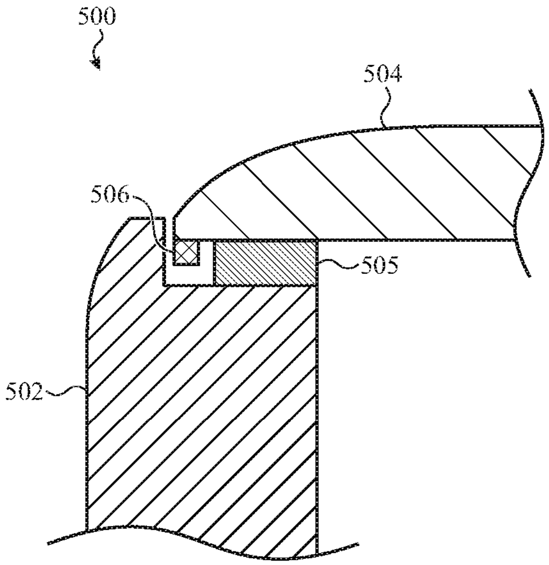

FIG. 5B illustrates another example of a compression limiter 506 that is defined by the housing 502. For example, the compression limiter 506 can include a ledge formed in the housing 502, wherein the ledge prevents full compression of the seal 505. FIGS. 5C and 5D illustrate additional examples of compression limiters 506 that are attached to the cover 504 and contact the housing 502 as the cover 504 moves toward the housing 502 to prevent full compression of the seal 505. FIGS. 5A-5B are provided as examples of different compression limiter configurations 506 to illustrate how a compression limiter 506 may be implemented in the electronic device 500. Accordingly, other configurations are possible.

Figure 6A:
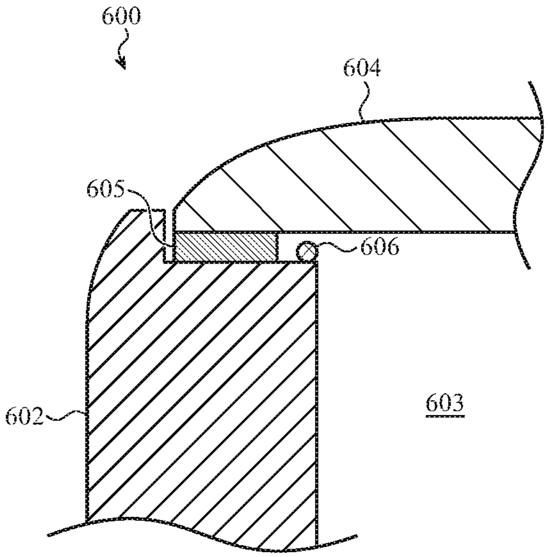
FIGS. 6A and 6B illustrate an example air-permeable seal for an electronic device.
Figure 6B:
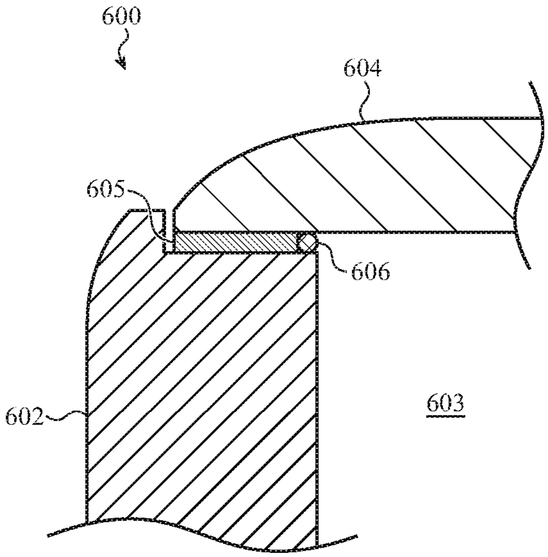

FIGS. 6A and 6B illustrate examples of an electronic device 600 including a seal 605 including a backup seal 606. The electronic device 600 can be an example of the electronic devices described herein and can include a housing 602, a cover 604 as described herein, and the seal 605, which may be an example of the seals described herein (e.g., seals 105, 205, 305, 405, and 505).

As illustrated in FIG. 6A, a backup seal 606 can be positioned between the housing 602 and the cover 604. The backup seal 606 can be positioned alongside the seal 605. In an expanded state, the backup seal 606 can be offset from the cover 604 to form a gap between a top of the backup seal 606 and the cover 604. In this regard, air that passes through the seal 605 can also pass into an internal chamber 603 of the electronic device 600, and allow a pressure within the electronic device to equalize with a pressure of the external environment 603.

As illustrated in FIG. 6B, as the cover 604 moves toward the housing 602 and the seal 605 compresses, the cover 604 can contact the backup seal 606. The backup seal 606 can be impermeable to water and/or air. Accordingly, even if air and/or water passes through the seal 605, the backup seal 606 can prevent the water or air from reaching the internal chamber 603. In some cases, the backup seal 606 can have a greater impermeability to water and/or air than the seal 605. Additionally or alternatively, the backup seal 606 can function as a compression limiter as described herein.

Figure 7:
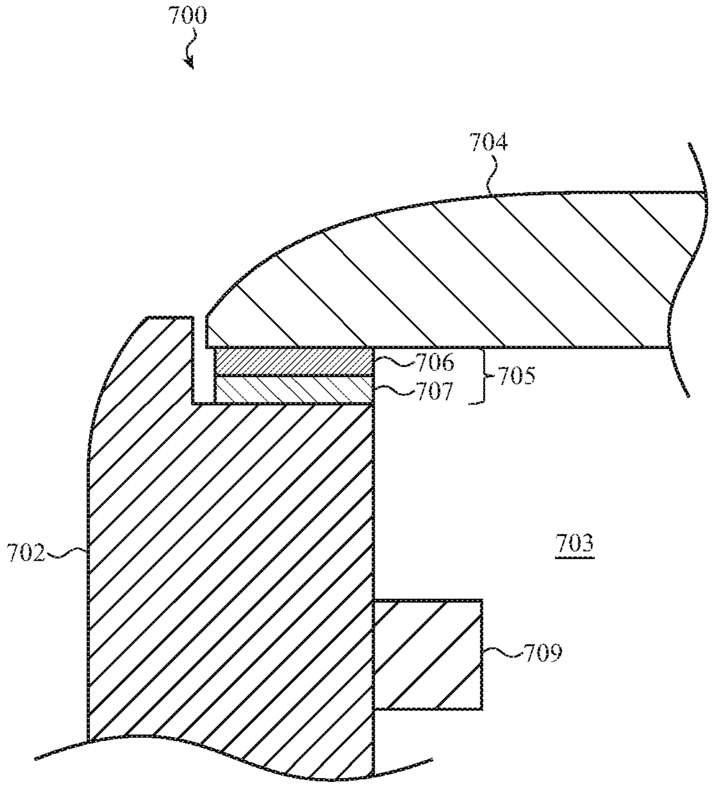
FIG. 7 illustrates an example air-permeable seal for an electronic device.

FIG. 7 illustrates an example of an electronic device 700 that includes a seal 705 including an air-permeable material 706 and a compression layer 707. The electronic device 700 can be an example of the electronic devices described herein and can include a housing 702 and a cover 704, which can be examples of the housings and the covers as described herein. The seal 705 can be an example of the seals described herein and can include an air-permeable material as described herein. The seal 705 can further include the compression layer 707 stacked with the air-permeable material 706. The compression layer 707 can be used to estimate external pressures by compressing in response to increasing external pressure thereby decreasing the volume within the internal chamber 703 and increasing the pressure.

For example, the compression layer 707 can be configured to undergo a greater deflection than the air-permeable material 706. In this regard, once the air-permeable material 706 has been compressed, the air pressure in the internal chamber 703 can no longer equalize with the air pressure of the external environment, and the compression layer 707 may remain uncompressed. Then, further increases in the external pressure may cause the compression layer 707 to compress, thereby decreasing the volume of the internal chamber 703 and increasing the pressure within the internal chamber 703. A pressure-sensing device 709 (e.g., pressure transducer, or other pressure-sensing device) located within the internal chamber can measure this increase in pressure and use this change in pressure to estimate an external pressure and/or change in external pressure of the environment around the electronic device 700. For example, the estimated external pressure could correspond to a water pressure on the electronic device 700 and may be used as a depth gauge to determine a water depth, for example, when diving or performing other underwater activities.

Figure 8:
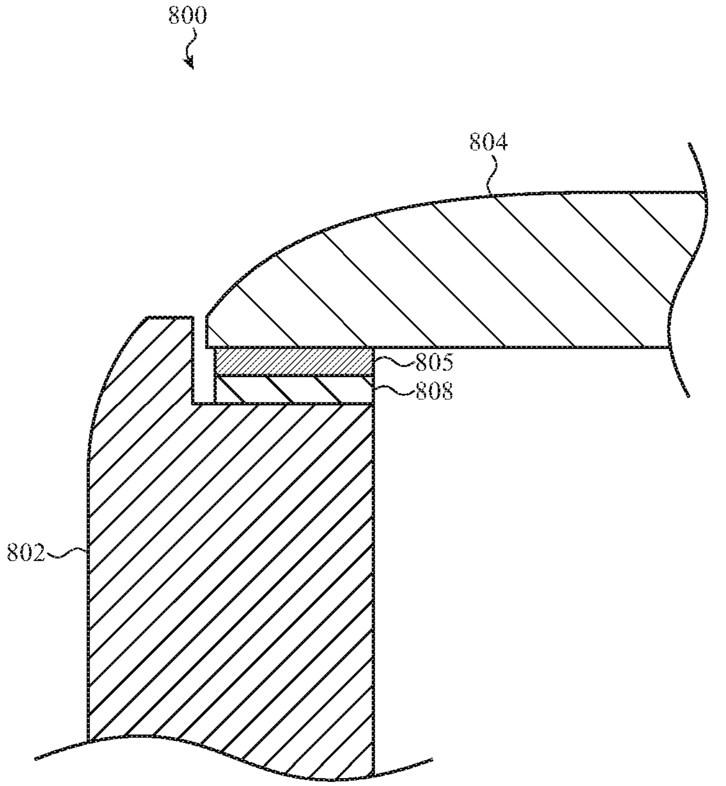
FIG. 8 illustrates an example air-permeable seal for an electronic device.

FIG. 8 illustrates an example of an electronic device 800 that includes a force sensor 808 positioned between a cover 804 and a housing 802. The electronic device 800 can be an example of the electronic devices described herein. The force sensor 808 can be used to estimate a force applied to the cover 804 of the electronic device 800. For example, a force sensor 808 could include a capacitive force sensor, a piezoelectric force sensor, a resistive force sensor, and so on, that is coupled between the cover 804 and the housing 802. In some cases, the force sensor 808 can be stacked with a seal 805. In other examples, the force sensor 808 could be mounted in parallel with the seal 805, for example one or more force sensors could be positioned at intermittent locations along the seal 805.

Figure 9:
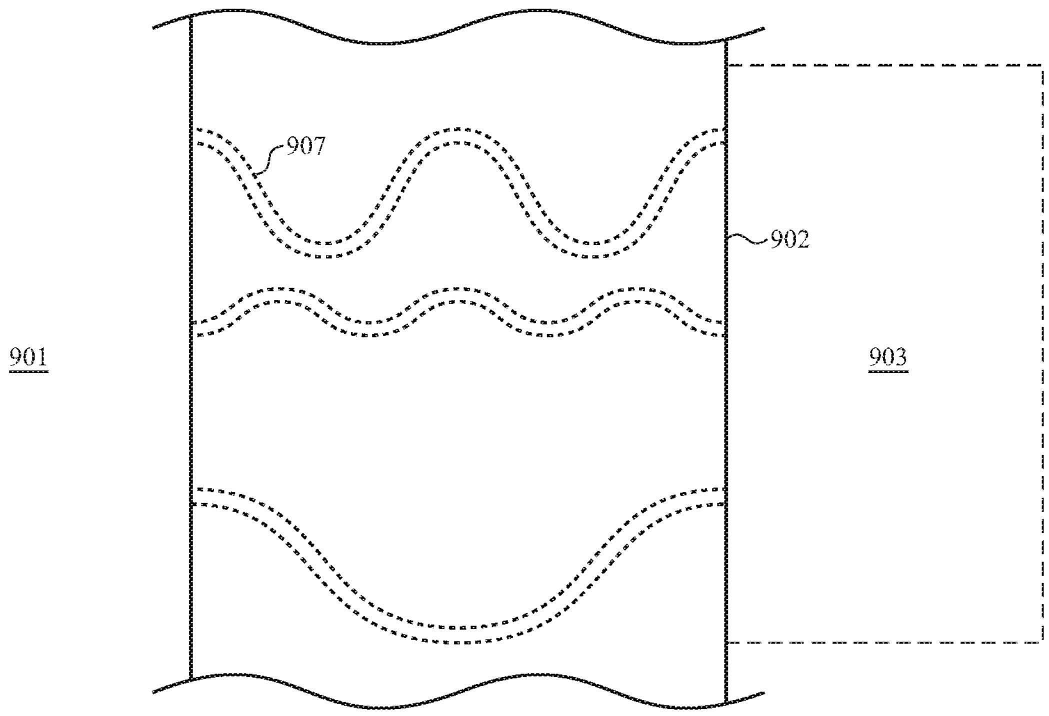
FIG. 9 illustrates an example air-permeable material for a seal for an electronic device.

FIG. 9 illustrates an example of an air-permeable material 902 that can be used in a seal, as described herein. The air-permeable material 902 can include one or more channels that form circuitous paths 907 between an external environment 901 and an internal chamber 903 of an electronic device. In a first state, for example, when the electronic device is located in an ambient air environment, the paths 907 may be substantially open and allow air to move between the external environment 901 and the internal chamber 903. Also, in the first state, the paths 907 can prevent water at the ambient pressure from ingress into the internal chamber 903. For example, the air-permeable material 902 can include hydrophobic elements at the paths 907 that resist water. In some cases, the size and/or shape of the paths 907 may prevent water from ingress into the internal chamber 903. In a second state, for example, when the electronic device is submerged in water, the paths 907 may compress, collapse, or otherwise restrict such that the air-permeable material 902 increases in resistance to water ingress into the internal chamber 903.

Figure 10:
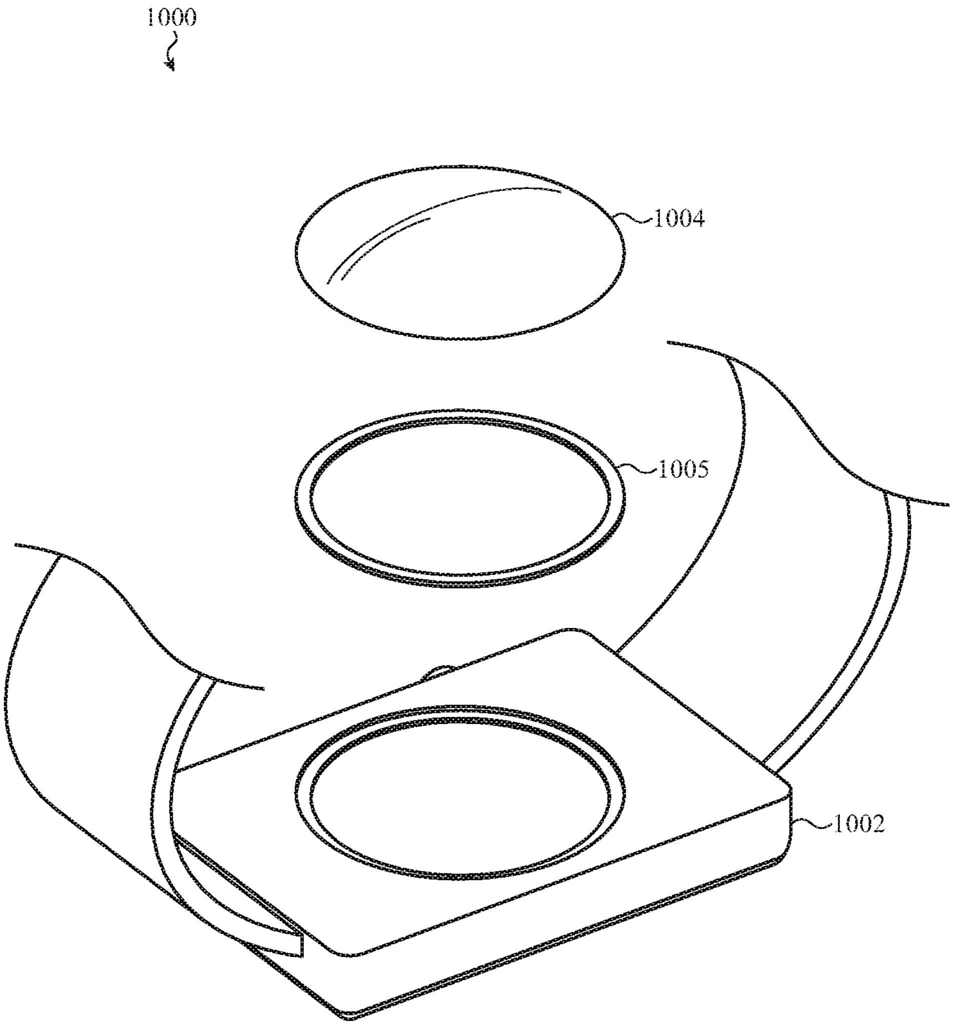
FIG. 10 illustrates an exploded view of a backside of an electronic device with a back cover incorporating an air-permeable seal.

FIG. 10 illustrates an exploded view of a backside of an electronic device 1000 with a back cover 1004 incorporating an air-permeable seal 1005. The seal 1005 can be an example of the seals described herein and can be positioned between various sections of an electronic device to allow air movement between the inside of the device and the external environment, while resisting the ingress of water into the electronic device. For example, the seal 1005 can be positioned between a rear cover (e.g., rear crystal) and the housing 1002 of the electronic device 1000. In this regard, the seal 1005 can allow the internal pressure of the electronic device to equalize with an air pressure of the external environment. In various other embodiments, one or more seals, as described herein, can be positioned at different locations and/or structures of the electronic device 1000.

Figure 11:
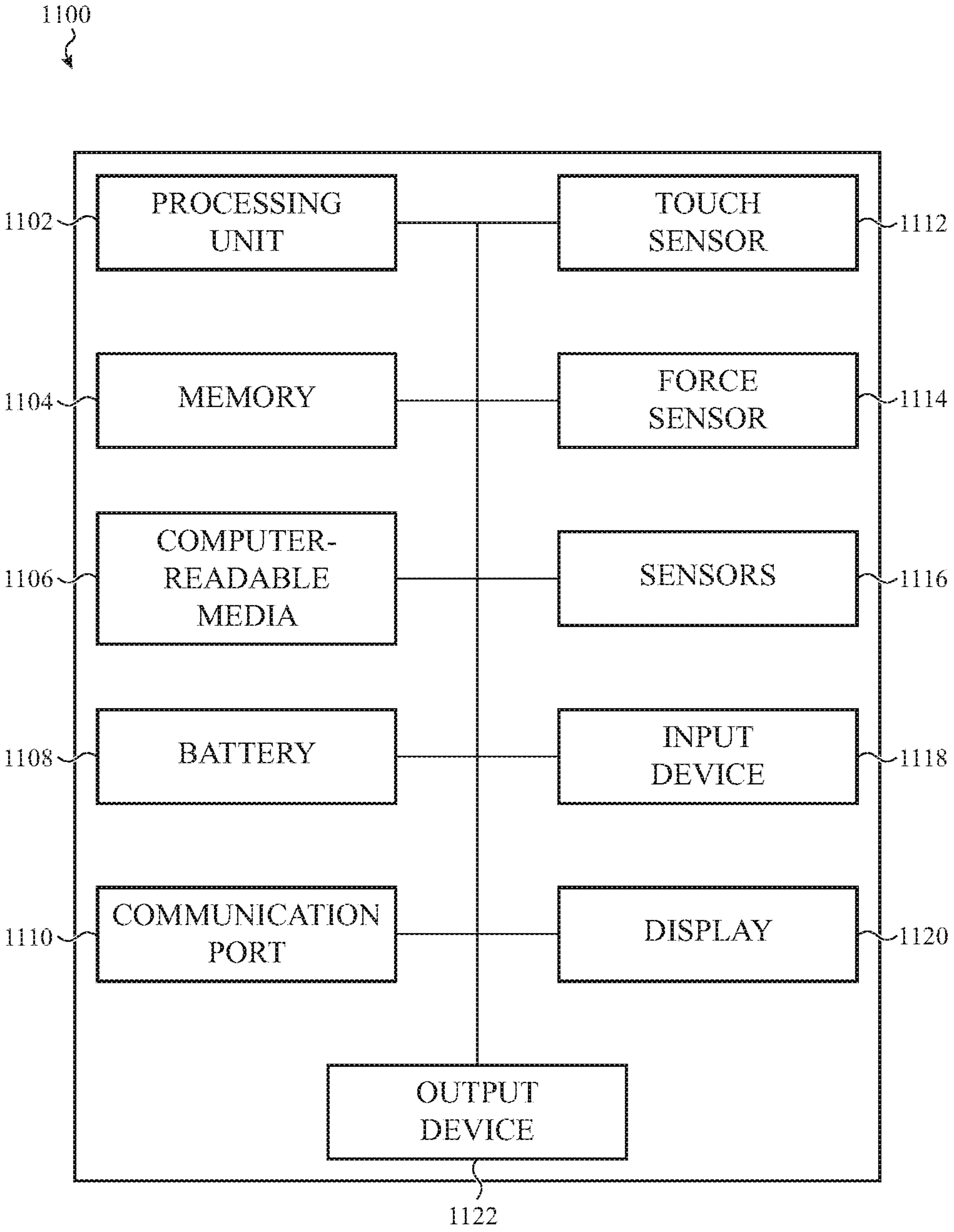
FIG. 11 is a block diagram illustrating an example electronic device, within which an air-permeable seal can be integrated.

FIG. 11 is a block diagram illustrating an example electronic device 1100, within which an air-permeable seal can be integrated. By way of example, the device 1100 of FIG. 11 may correspond to the electronic devices shown in FIGS. 1A-10 (or any other wearable electronic device described herein). To the extent that multiple functionalities, operations, and structures are disclosed as being part of, incorporated into, or performed by the device 1100, it should be understood that various embodiments may omit any or all such described functionalities, operations and structures. Thus, different embodiments of the device 1100 may have some, none, or all of the various capabilities, apparatuses, physical features, modes, and operating parameters discussed herein.

As shown in FIG. 11, the device 1100 includes a processing unit 1102 operatively connected to computer memory 1104 and/or computer-readable media 1106. The processing unit 1102 may be operatively connected to the memory 1104 and computer-readable media 1106 components via an electronic bus or bridge. The processing unit 1102 may include one or more computer processing units or microcontrollers that are configured to perform operations in response to computer-readable instructions. The processing unit 1102 may include the central processing unit (CPU) of the device.

Additionally or alternatively, the processing unit 1102 may include other processing units within the device including application specific integrated chips (ASIC) and other microcontroller devices.

In some embodiments the processing unit 1102 may modify, change, or otherwise adjust operation of the electronic device in response to an output of one or more of the pressure-sensing devices, as described herein. For example, the processing unit 1102 may shut off the electronic device 1100 or suspend certain functions, like audio playback, if the pressure sensed by the pressure-sensing device exceeds a threshold. Likewise, the processing unit 1102 may activate the device or certain functions if the sensed pressure drops below a threshold (which may or may not be the same threshold previously mentioned). As yet another option, the processing unit 1102 may cause an alert to be displayed if pressure changes suddenly, as sensed by the pressure-sensing unit. This alert may indicate that a storm is imminent, a cabin or area has become depressurized, a port is blocked, and so on.

The memory 1104 may include a variety of types of non-transitory computer-readable storage media, including, for example, read access memory (RAM), read-only memory (ROM), erasable programmable memory (e.g., EPROM and EEPROM), or flash memory. The memory 1104 is configured to store computer-readable instructions, sensor values, and other persistent software elements. Computer-readable media 1106 also includes a variety of types of non-transitory computer-readable storage media including, for example, a hard-drive storage device, a solid-state storage device, a portable magnetic storage device, or other similar device. The computer-readable media 1106 may also be configured to store computer-readable instructions, sensor values, and other persistent software elements.

In this example, the processing unit 1102 is operable to read computer-readable instructions stored on the memory 1104 and/or computer-readable media 1106. The computer-readable instructions may adapt the processing unit 1102 to perform the operations or functions described above with respect to FIGS. 1A-6. In particular, the processing unit 1102, the memory 1104, and/or the computer-readable media 1106 may be configured to cooperate with a sensor 1116 (e.g., an image sensor that detects input gestures applied to an imaging surface of a crown) to control the operation of a device in response to an input applied to a crown of a device (e.g., the crown 108). The computer-readable instructions may be provided as a computer-program product, software application, or the like.

The device 1100 may also include a battery 1108 that is configured to provide electrical power to the components of the device 1100. The battery 1108 may include one or more power storage cells that are linked together to provide an internal supply of electrical power. The battery 1108 may be operatively coupled to power management circuitry that is configured to provide appropriate voltage and power levels for individual components or groups of components within the device 1100. The battery 1108, via power management circuitry, may be configured to receive power from an external source, such as an AC power outlet. The battery 1108 may store received power so that the device 1100 may operate without connection to an external power source for an extended period of time, which may range from several hours to several days.

The device 1100 may also include a communication port 1110 that is configured to transmit and/or receive signals or electrical communication from an external or separate device. The communication port 1110 may be configured to couple to an external device via a cable, adaptor, or other type of electrical connector. In some embodiments, the communication port 1110 may be used to couple the device 1100 to an accessory, including a dock or case, a stylus or other input device, smart cover, smart stand, keyboard, or other device configured to send and/or receive electrical signals The device 1100 may also include a touch sensor 1112 that is configured to determine a location of a touch on a touch-sensitive surface of the device 1100 (e.g., an input surface defined by the portion of a cover 104 over a display 109). The touch sensor 1112 may use or include capacitive sensors, resistive sensors, surface acoustic wave sensors, piezoelectric sensors, strain gauges, or the like. In some cases the touch sensor 1112 associated with a touch-sensitive surface of the device 1100 may include a capacitive array of electrodes or nodes that operate in accordance with a mutual-capacitance or self-capacitance scheme. The touch sensor 1112 may be integrated with one or more layers of a display stack (e.g., the display 109) to provide the touch-sensing functionality of a touchscreen. Moreover, the touch sensor 1112, or a portion thereof, may be used to sense motion of a user's finger as it slides along a surface of a crown, as described herein.

The device 1100 may also include a force sensor 1114 that is configured to receive and/or detect force inputs applied to a user input surface of the device 1100 (e.g., the display 109). The force sensor 1114 may use or include capacitive sensors, resistive sensors, surface acoustic wave sensors, piezoelectric sensors, strain gauges, or the like. In some cases, the force sensor 1114 may include or be coupled to capacitive sensing elements that facilitate the detection of changes in relative positions of the components of the force sensor (e.g., deflections caused by a force input). The force sensor 1114 may be integrated with one or more layers of a display stack (e.g., the display 109) to provide force-sensing functionality of a touchscreen.

The device 1100 may also include one or more sensors 1116. In some cases, the sensors may include a fluid-based pressure-sensing device (such as an oil-filled pressure-sensing device) that determines conditions of an ambient environment external to the device 1100, a temperature sensor, a liquid sensor, or the like. The sensors 1116 may also include a sensor that detects inputs provided by a user to a crown of the device (e.g., the crown 108). As described above, the sensors 1116 may include sensing circuitry and other sensing elements that facilitate sensing of gesture inputs applied to an imaging surface of a crown, as well as other types of inputs applied to the crown (e.g., rotational inputs, translational or axial inputs, axial touches, or the like). The sensors 1116 may include an optical sensing element, such as a charge-coupled device (CCD), complementary metal-oxide-semiconductor (CMOS), or the like. The sensors 1116 may correspond to any sensors described herein or that may be used to provide the sensing functions described herein.

In some cases, the device 1100 can include a pressure-sensing system that has multiple pressure-sensing devices that are positioned within different chambers or internal volumes of the electronic device. One pressure-sensing device may be located in a sealed volume or first internal chamber of the electronic device and another pressure-sensing device may be located in a vented or open volume or second internal chamber of the device. The sealed internal chamber may include an air-permeable seal, as described herein, that prevents water, dust, and/or other contaminants from entering the sealed housing. Air may pass through the air-permeable seal thereby equalizing the internal pressure of the sealed internal chamber with a pressure of an external environment. This internal pressure-sensing device is protected from moisture and contaminants, which helps maintain accurate pressure measurements over the life of the device and in a variety of operating environments. In some cases, the electronic device 1100 may include a pressure-sensing device located within a second unsealed chamber of a housing of the device. The second unsealed internal chamber may be coupled with an external environment (e.g., exposed to the atmosphere) via a port that is defined by an outer shell of the housing.

Operation of the internal and external pressure-sensing devices may be coordinated based on one or more monitored conditions of the electronic device 1100 and/or an output from one or both of the pressure-sensing devices. In some cases, the electronic device 1100 may monitor one or more conditions, such as whether the external pressure-sensing device has been exposed to moisture. If the electronic device 1100 determines that the external pressure-sensing device has been exposed to moisture, the electronic device 1100 can use pressure signals from the internal pressure-sensing device to determine an environmental pressure, or determine when the external pressure-sensing device has dried sufficiently. For example, an electronic device 1100 may initially determine an environmental pressure using the external pressure-sensing device. Subsequently, the electronic device 1100 may determine that the external pressure-sensing device has been exposed to moisture and switch to using pressure signals from the internal pressure-sensing device while the external pressure-sensing device dries.

In some embodiments, the device 1100 includes one or more input devices 1118. An input device 1118 is a device that is configured to receive user input. The one or more input devices 1118 may include, for example, a push button, a touch-activated button, a keyboard, a key pad, or the like (including any combination of these or other components). In some embodiments, the input device 1118 may provide a dedicated or primary function, including, for example, a power button, volume buttons, home buttons, scroll wheels, and camera buttons. Generally, a touch sensor or a force sensor may also be classified as an input device. However, for purposes of this illustrative example, the touch sensor 1112 and the force sensor 1114 are depicted as distinct components within the device 1100.

As shown in FIG. 11, the device 1100 also includes a display 1120. The display 1120 may include a liquid-crystal display (LCD), organic light emitting diode (OLED) display, light emitting diode (LED) display, or the like. If the display 1120 is an LCD, the display 1120 may also include a backlight component that can be controlled to provide variable levels of display brightness. If the display 1120 is an OLED or LED type display, the brightness of the display 1120 may be controlled by modifying the electrical signals that are provided to display elements. The display 1120 may correspond to any of the displays shown or described herein.

In some embodiments, the device 1100 includes one or more output devices 1122. An output device 1122 is a device that is configured to produce an output that is perceivable by a user. The one or more output devices 1122 may include, for example, a speaker, a light source (e.g., an indicator light), an audio transducer, a haptic actuator, or the like.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A smartwatch comprising:
- a housing defining an internal volume;
- a touch-sensitive display positioned at least partially within the internal volume;
- a front cover positioned over the touch-sensitive display, the front cover defining a front exterior surface of the smartwatch and configured to move from a first position to a second position in response to an increase in pressure on the front cover; and
- a seal positioned between the housing and the front cover and configured to transition between an uncompressed state and a compressed state in response to the front cover moving from the first position and to the second position, wherein:
  - in the uncompressed state, the seal is configured to equalize a first pressure within the housing with a second pressure of the external environment; and
  - in the compressed state, the seal is configured to inhibit water ingress.

2. The smartwatch of claim 1, wherein:
- in the uncompressed state, the seal comprises one or more passages that allow air to move between the internal volume and an external environment; and
- in the compressed state, the one or more passages are at least partially collapsed.

3. The smartwatch of claim 1, wherein the seal comprises a porous material that is configured to inhibit water ingress when exposed to a first external pressure.

4. The smartwatch of claim 3, wherein the seal further comprises:
- a first adhesive layer that couples the porous material to the front cover; and
- a second adhesive layer that couples the porous material to the housing.

5. The smartwatch of claim 1, wherein:
- in the uncompressed state, the seal has a first density; and
- in the compressed state, the seal has a second density greater than the first density.

6. The smartwatch of claim 1, wherein, in the compressed state, the seal is air-impermeable.

7. The smartwatch of claim 1, wherein:
- the housing defines an upper opening;
- the housing defines a ledge that extends around the upper opening;
- the seal is positioned along the ledge; and
- the front cover extends at least partially into the upper opening of the housing.

8. The smartwatch of claim 1, wherein:
- the smartwatch further comprises a force sensor that is configured to detect a force applied to the front cover; and
- the seal is positioned along a surface of the force sensor.

9. The smartwatch of claim 1, wherein the seal comprises polytetrafluoroethylene material.

10. An electronic watch comprising:
- a housing that defines an internal chamber of the electronic watch;
- a cover coupled to the housing and defining a front surface of the electronic watch, the cover configured to move from a first position to a second position in response to an increase in pressure on the front cover;

a processing unit positioned within the internal chamber; and a compressible seal positioned between the housing and the cover, the compressible seal configured to increase in density in response to the cover moving from the first position and to the second position; wherein:

when the cover is subjected to an ambient air environment, the compressible seal is configured to resist an ingress of water at a first water pressure and equalize an air pressure within the internal chamber with an air pressure of the ambient environment; and when the cover is subjected to a submerged water environment, the compressible seal is configured to resist an ingress of water at a second water pressure greater than the first water pressure.

11. The electronic watch of claim 10, wherein:

the compressible seal comprises:

a first adhesive layer coupled to the housing;

a second adhesive layer coupled to the cover; and a porous layer positioned between the first adhesive layer and the second adhesive layer; and the porous layer is configured to compress in response to the pressure on the front surface of the cover increasing.

12. The electronic watch of claim 10, wherein:

the cover comprises a set of side surfaces; and the compressible seal is coupled to a back surface of the cover and is positioned adjacent to the set of side surfaces.

13. The electronic watch of claim 10, wherein:

the housing defines an opening; and the cover is positioned at least partially within the opening.

14. The electronic watch of claim 13, wherein:

the electronic watch defines a gap between the cover and the housing; and the gap provides a path between the ambient air environment and the compressible seal.

15. The electronic watch of claim 10, wherein the compressible seal couples the cover to the housing.

16. The electronic watch of claim 10, wherein:

the electronic watch further comprises:

a pressure transducer positioned within the internal chamber; and a compression layer positioned between the cover and the housing;

the compression layer is adjacent to the compressible seal;

the compression layer is configured to allow the cover to translate in response to changes in the pressure on the cover; and the pressure transducer is configured to detect an internal pressure change caused by the translation of the cover.

17. An electronic device, comprising:

a housing;

a cover coupled to the housing to define an internal volume, the cover defining a surface of the electronic device and configured to move toward the housing in response to an increase in pressure on the front cover; and a seal extending along a perimeter of the cover and coupling the cover to the housing, the seal configured to compress in response to the cover moving toward the housing, wherein:

in response to a first external pressure, the seal is configured to exhibit a first level of air-permeability configured to equalize a first pressure within the internal volume with a second pressure of the external environment; and in response to a second external pressure, greater than the first external pressure, the seal is configured to exhibit a second level of air-permeability that is less than the first level of air-permeability.

18. The electronic device of claim 17, wherein:

in response to the first external pressure, the seal is configured to have a first resistance to water entering the housing; and in response to the second external pressure, the seal is configured to have a second resistance to water entering the housing, wherein the second resistance is greater than the first resistance.

19. The electronic device of claim 17, wherein:

in response to the second external pressure, the seal is configured to compress; and the electronic device further comprises a compression limiter that is less compressible than the seal.

20. The electronic device of claim 19, wherein the compression limiter comprises a ledge defined by the housing.

* * * * *